No. 710,725. Patented Oct. 7, 1902.
M. F. & C. STEPHENS.
PIPE JOINT.
(Application filed Apr. 15, 1902.)
(No Model.)
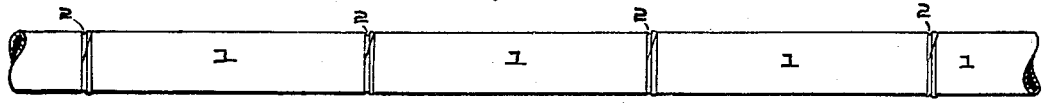
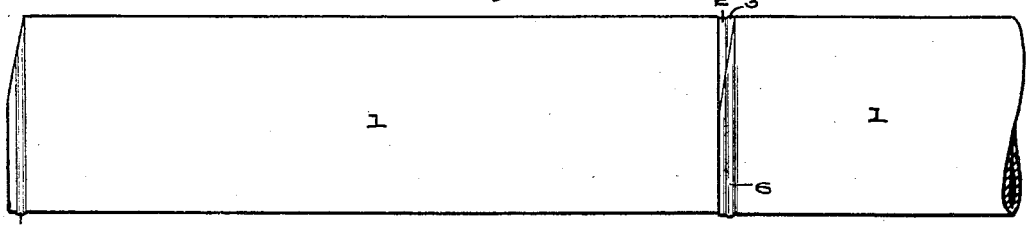
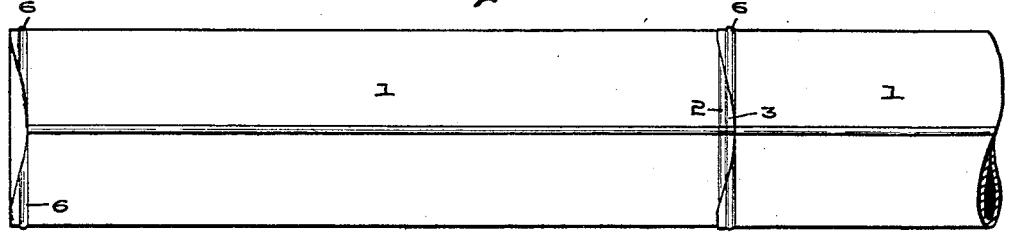
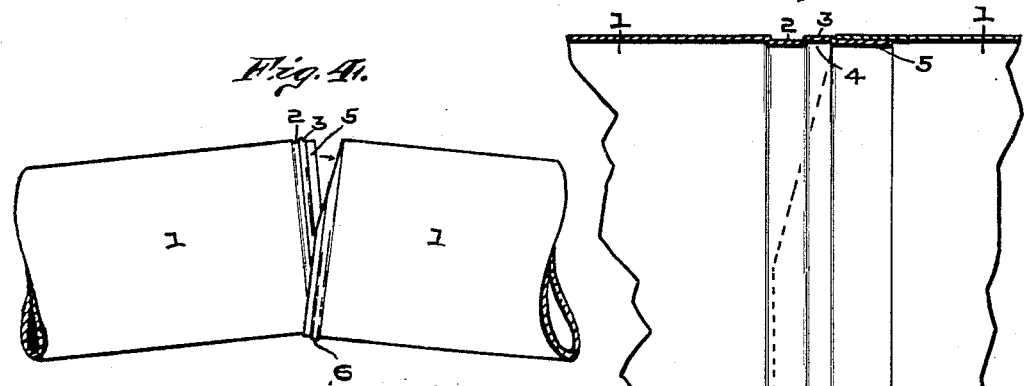
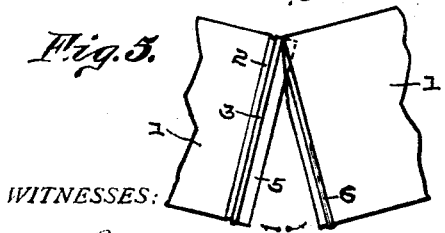
WITNESSES:
C. C. Topp.
L. E. Woerner.
INVENTORS
Marcus F. Stephens,
Cyrus Stephens,
BY
Frank W. Woerner.
ATTORNEY.

UNITED STATES PATENT OFFICE.

MARCUS F. STEPHENS AND CYRUS STEPHENS, OF INDIANAPOLIS, INDIANA.

PIPE-JOINT.

SPECIFICATION forming part of Letters Patent No. 710,725, dated October 7, 1902.

Application filed April 15, 1902. Serial No. 102,995. (No model.)

*To all whom it may concern:*

Be it known that we, MARCUS F. STEPHENS and CYRUS STEPHENS, citizens of the United States, residing at Indianapolis, in the county of Marion and State of Indiana, have invented certain new and useful Improvements in Pipe-Joints, of which the following is a specification.

The object of our invention is to produce a joint for pipes made of sheet material—such as stovepipes, down-spouts, &c.—and which is of such construction that the sections of a pipe can be readily united or separated and still when the pipe is in position the joints will add stability thereto.

Our invention is particularly adapted where piping of great length is laid on a horizontal plane.

The object consists, further, in providing the inserted ends of the pipe-sections with an annular groove and a shoulder, while the overlapping ends have a similar groove and shoulder, except that they do not encircle the pipe for the reason that a portion of the ends are cut on an inclination which intersects the groove and shoulder. The object in cutting the overlapping ends of the pipe-sections, together with the construction and arrangements of the several parts, will be hereinafter more particularly described, and then pointed out in the claim.

Referring to the accompanying drawings, which are made a part hereof, and on which similar numerals of reference indicate similar parts, Figure 1 is a side elevation of a pipe comprising a number of sections secured together by means of our invention. Fig. 2 is a side elevation, on an enlarged scale, of a pipe-section jointed to a portion of another section and shows the union more plainly. Fig. 3 is a plan view of the construction shown in Fig. 2. Fig. 4 is a fragmentary detail of the ends of two pipe-sections and shows the manner of disconnecting them. Fig. 5 is a view similar to Fig. 4, except it shows the position the sections occupy when connecting them; and Fig. 6 is a vertical section of the pipe-joint on a still further enlarged scale and showing the parts interlocked.

In the drawings, 1 represents the pipe-sections; 2, an annular groove; 3, an annular shoulder running alongside and parallel with the groove 2; 5, the extended ends of the sections beyond the shoulder 3. Each section of pipe is supplied on the inserted ends with the groove and shoulder which encircle the same. The overlapping ends are provided with a similar groove and shoulder to the inserted ends, except that they do not continue around the entire periphery of the pipe, as the said ends are for a portion of the distance cut on an inclination, which inclination commences about the middle of the pipe and terminates at the rear base line of the annular shoulder 6 on the overlapping ends, and, as shown in Fig. 6, when the parts are interlocked the straight surface of the pipes abut the shoulder 3 on the next section, while the grooves at the bottom form the locking device. The inclination is always at the top of the pipe-sections, which brings the ends of the overlapped sections directly against the shoulders 3 and prevents any sagging of the pipe when laid on a horizontal plane.

Fig. 5 shows the manner of connecting or uniting the pipe-sections. It will be seen that the upper ends of the overlapping sections, which are partly cut away, are the first placed over the end of the next section. The inner surface of the pipe at that point is smooth, and as it does not extend over the shoulder on the next section no obstacle is encountered. However, when the bottom is brought together the grooves and shoulder in each section meet and interlock. The pipe-sections must be sprung to unite them, and hence a union under tension is secured. The manner of disconnecting the sections is just the reverse.

Fig. 4 shows the manner of disconnecting the sections. The top portion of the sections being free are easily broken when pressure is brought to bear on the pipe on the opposite side of the inclination. When the sections are disconnected at the top, the interlocked corrugations at the bottom are readily separated.

Having thus fully described our said invention, what we desire to secure by Letters Patent is—

In a pipe-joint the combination of two sections of pipe the meeting ends of which are adapted to telescope with each other, the inner section having its end cut at a right angle to the axis of the pipe and provided near its end and on its outer surface with a rib and a groove which run parallel with respect to said end, and the outer section having part of its end cut at right angle to the axis of the pipe the remaining portion of said end being cut diagonally with respect to said axis, said outer section being formed near its end to fit the rib and groove of the inner section, said sections adapted to be sprung into place in forming the joint, substantially as described.

In witness whereof we have hereunto set our hands and seals, at Indianapolis, Indiana, this 28th day of March, A. D. 1902.

MARCUS F. STEPHENS. [L. S.]
    CYRUS STEPHENS. [L. S.]

Witnesses:
    L. B. SHAFER,
    F. W. WOERNER.